(12) United States Patent
Zhang et al.

(10) Patent No.: US 11,620,021 B1
(45) Date of Patent: Apr. 4, 2023

(54) METHODS AND APPARATUS FOR CROSS-COUPLING CORRECTION ON A TOUCH SENSOR PANEL

(71) Applicant: Apple Inc., Cupertino, CA (US)

(72) Inventors: Sai Zhang, Santa Clara, CA (US); Behrooz Shahsavari, Hayward, CA (US); Ari Y. Benbasat, San Jose, CA (US); Nima Ferdosi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,749

(22) Filed: Sep. 14, 2020

(51) Int. Cl.
*G06F 3/041* (2006.01)
*G06F 3/044* (2006.01)

(52) U.S. Cl.
CPC ........ *G06F 3/04186* (2019.05); *G06F 3/0445* (2019.05); *G06F 3/04164* (2019.05); *G06F 3/0412* (2013.01)

(58) Field of Classification Search
CPC .............. G06F 3/04186; G06F 3/0445; G06F 3/04164; G06F 3/0412
See application file for complete search history.

(56) References Cited

U.S. PATENT DOCUMENTS

| 9,256,321 | B2 | 2/2016 | Wang et al. |
| 10,261,685 | B2 | 4/2019 | Deselaers et al. |
| 11,301,099 | B1* | 4/2022 | Shahsavari ........... G06F 3/0445 |
| 2015/0268793 | A1* | 9/2015 | Vandermeijden ... G06F 3/04186 345/174 |
| 2018/0364854 | A1* | 12/2018 | Ramakrishnan .... G06F 3/04186 |
| 2020/0012382 | A1 | 1/2020 | Lee |

FOREIGN PATENT DOCUMENTS

WO     2019/191126 A1     10/2019

* cited by examiner

*Primary Examiner* — Afroza Chowdhury
(74) *Attorney, Agent, or Firm* — Kubota & Basol LLP

(57) ABSTRACT

Cross-coupling correction techniques on a touch sensor panel can be improved using machine learning models (particularly for touch sensor panels with relatively low signal-to-noise ratio). In some examples, the machine learning model can be implemented using a neural network. The neural network can receive a touch image and perform cross-coupling correction to mitigate cross-talk due to routing traces of the touch sensor panel. Mitigating cross-talk can improve touch sensing accuracy, reduce jitter, and/or reduce false positive touch detection.

23 Claims, 10 Drawing Sheets

METHODS AND APPARATUS FOR
CROSS-COUPLING CORRECTION ON A
TOUCH SENSOR PANEL

FIELD OF THE DISCLOSURE

This relates generally to touch sensor panels, and more particularly to techniques for cross-coupling correction on a touch sensor panel using machine learning models.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

BRIEF SUMMARY OF THE DISCLOSURE

This relates generally to techniques for cross-coupling correction (also referred to herein as cross-talk mitigation) on a touch sensor panel using machine learning models. In some examples, the machine learning model can be implemented using a neural network. The neural network can receive a touch image and perform cross-coupling correction to mitigate cross-talk due to routing traces of the touch sensor panel. Mitigating cross-talk can improve touch sensing accuracy, reduce jitter, and/or reduce false positive touch detection.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to techniques for cross-coupling correction (also referred to herein as cross-talk mitigation) on a touch sensor panel using machine learning models. In some examples, the machine learning model can be implemented using a neural network. The neural network can receive a touch image and perform cross-coupling correction to mitigate cross-talk due to routing traces of the touch sensor panel. Mitigating cross-talk can improve touch sensing accuracy, reduce jitter, and/or reduce false positive touch detection.

Figure 1A:
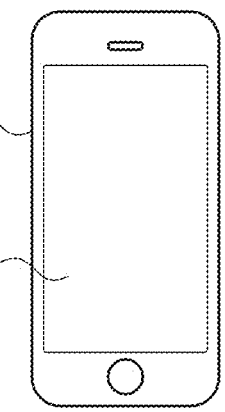
FIGS. 1A-1E illustrate touch sensing devices or systems that can include a touch screen or touch sensor panel according to examples of the disclosure.
Figure 1B:
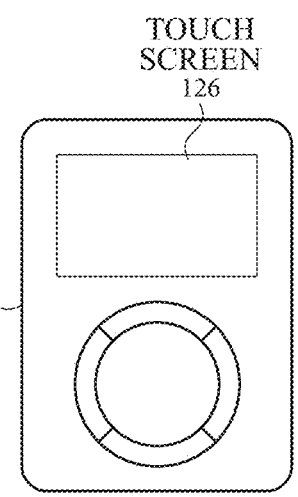
Figure 1C:
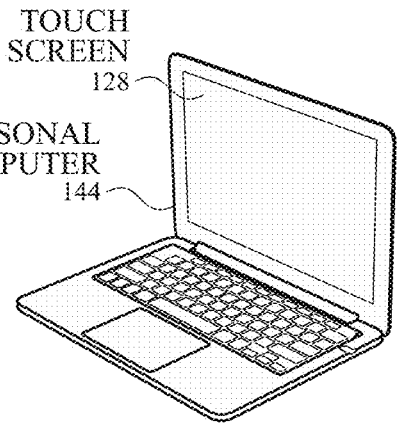
Figure 1D:
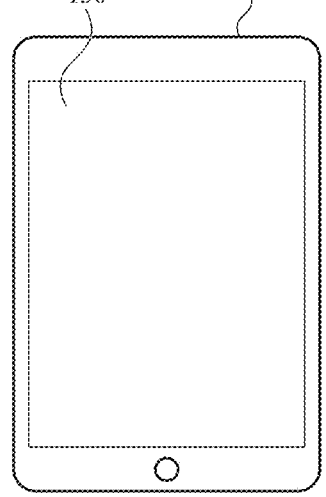
Figure 1E:
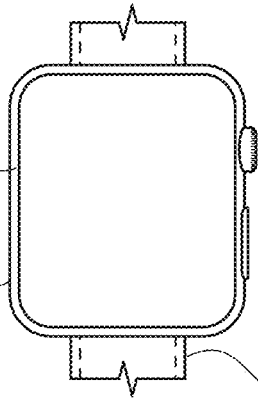

FIGS. 1A-1E illustrate touch sensing devices or systems that can include a touch screen or touch sensor panel according to examples of the disclosure. The touch screen or touch sensor panel can implement techniques for cross-coupling correction using machine learning models. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some examples, touch screens 124, 126, 128, 130 and 132 and touch sensor panels can be can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
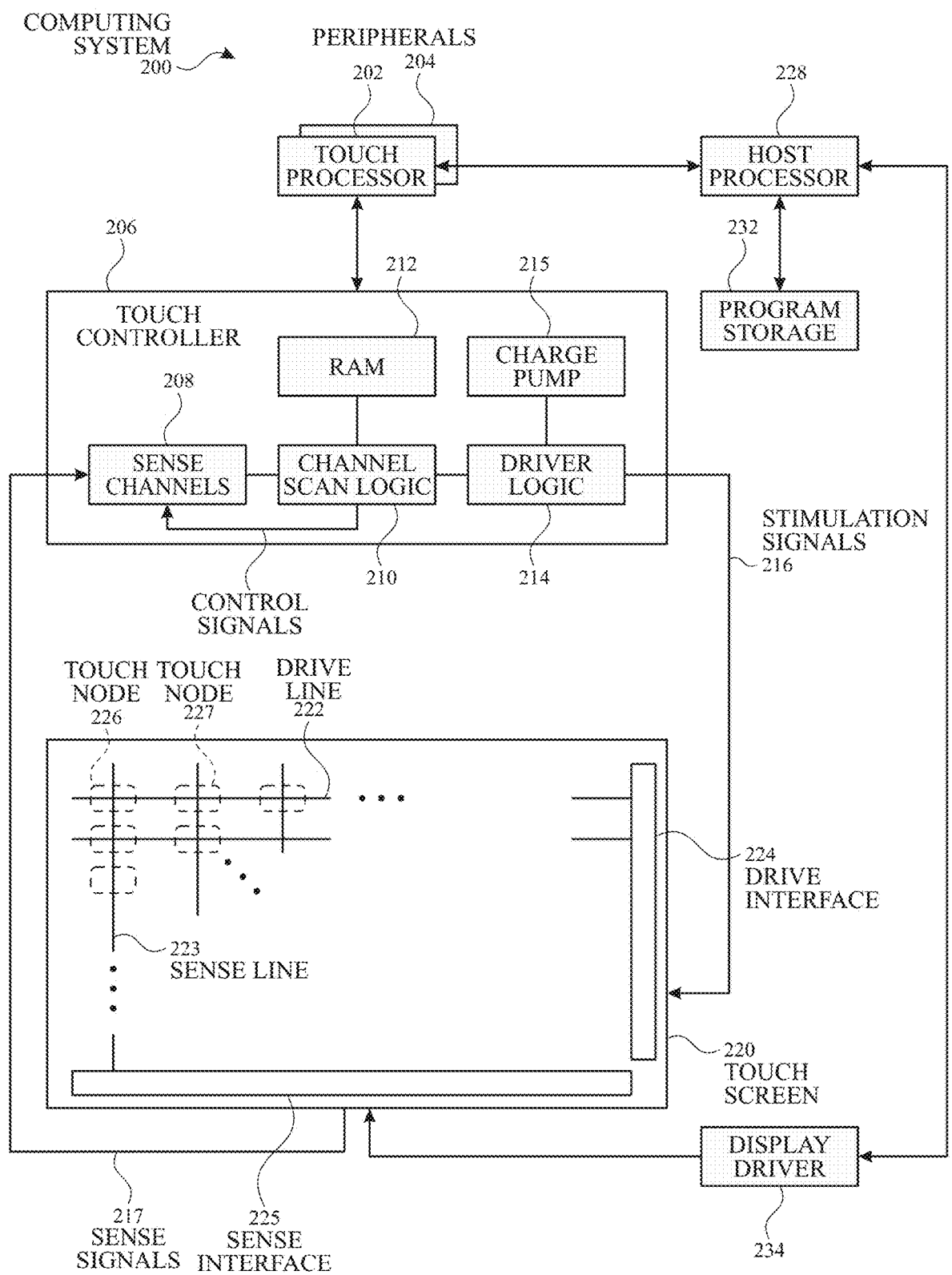
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can implement techniques for cross-coupling correction using machine learning models. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
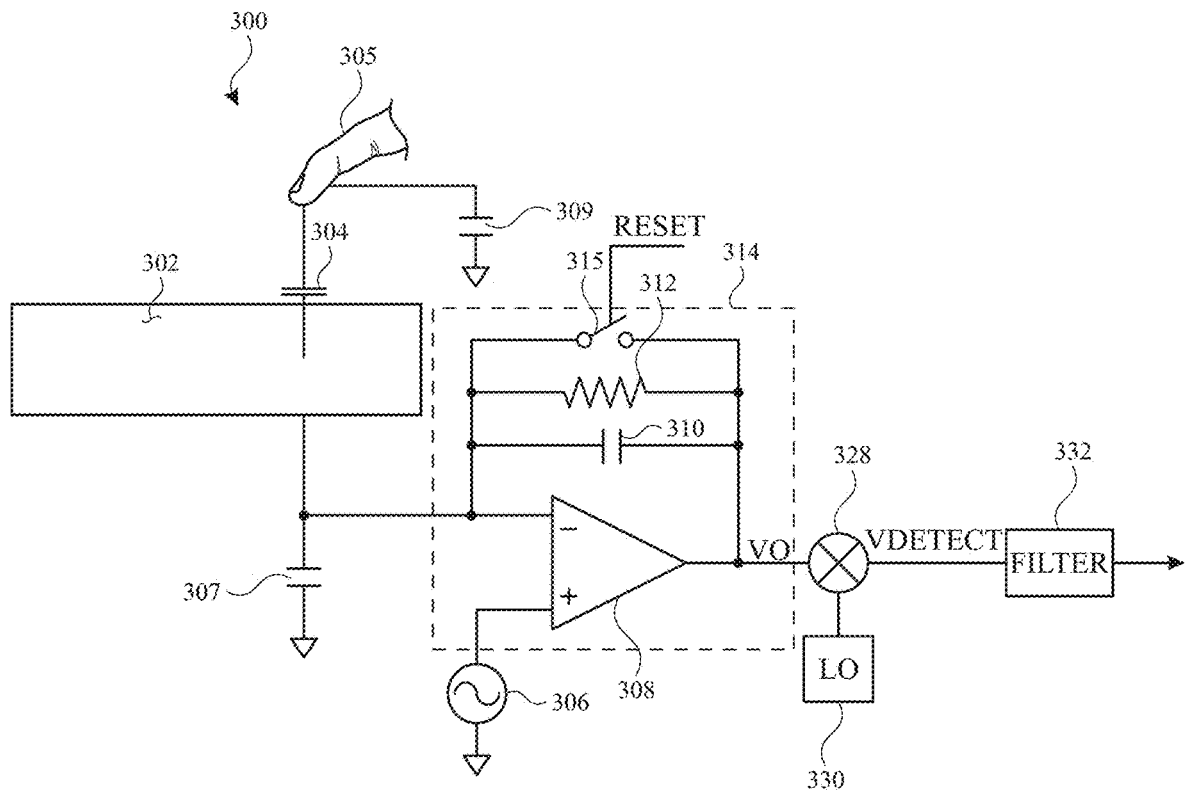
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
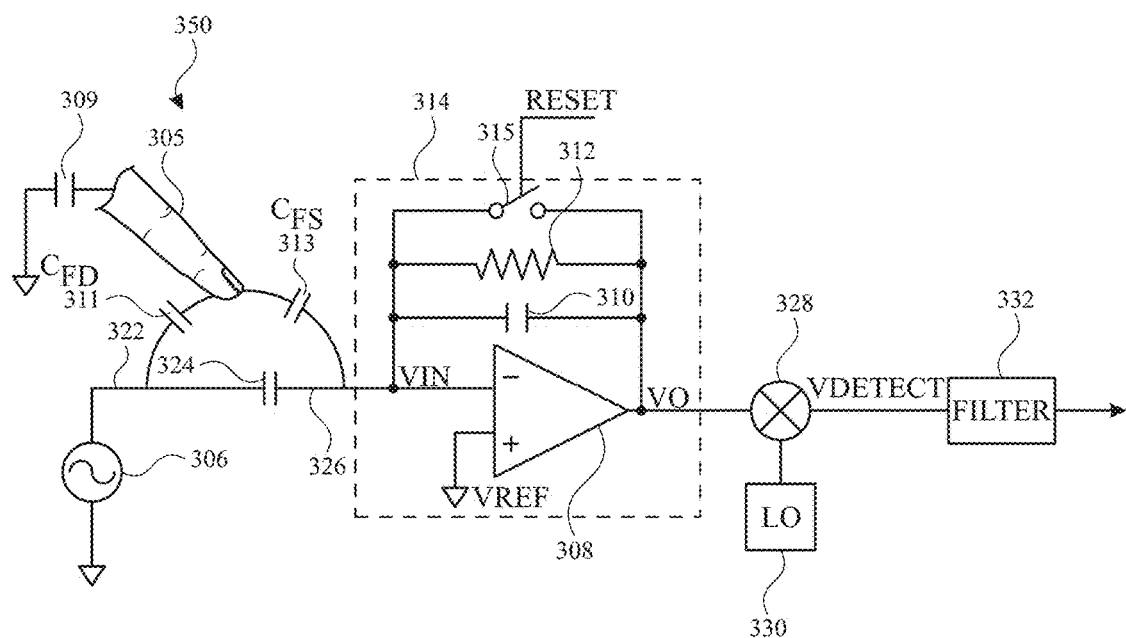
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
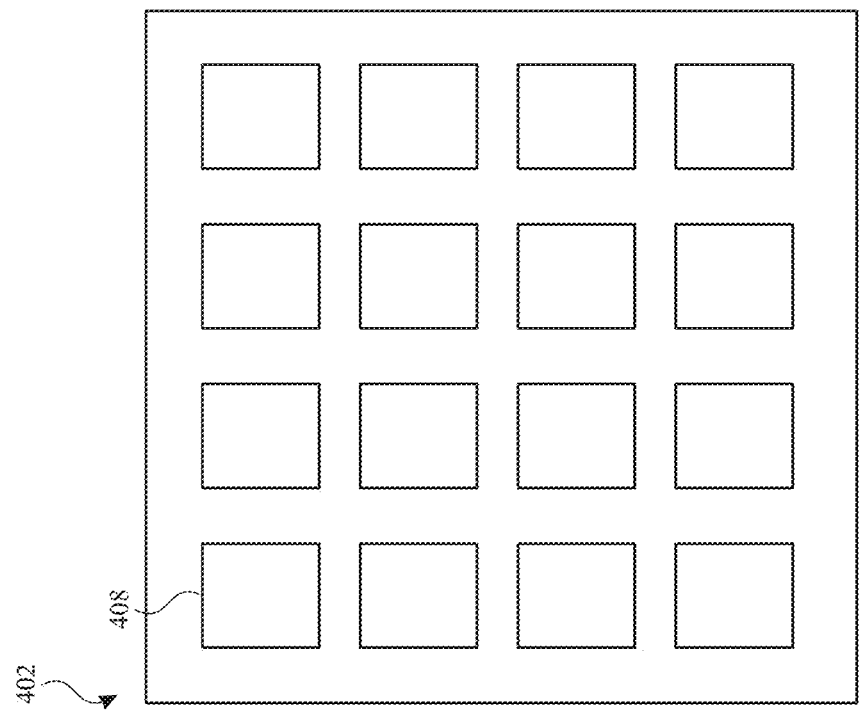
FIG. 4B illustrates a touch screen or touch sensor panel with touch node electrodes arranged in a pixelated touch node electrode configuration according to examples of the disclosure.
Figure 4A:
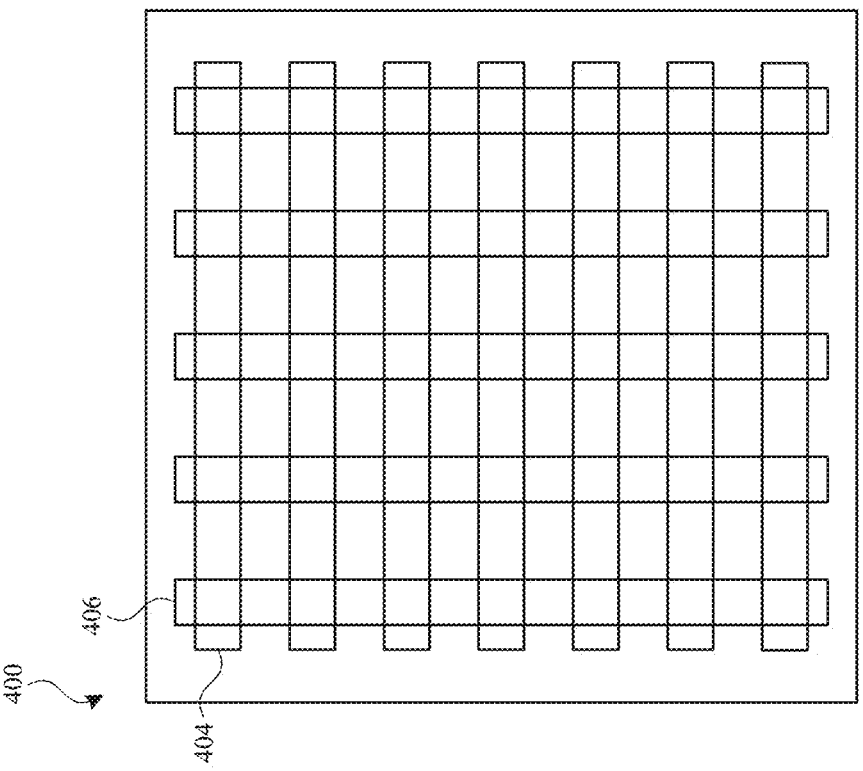
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

Figure 5:
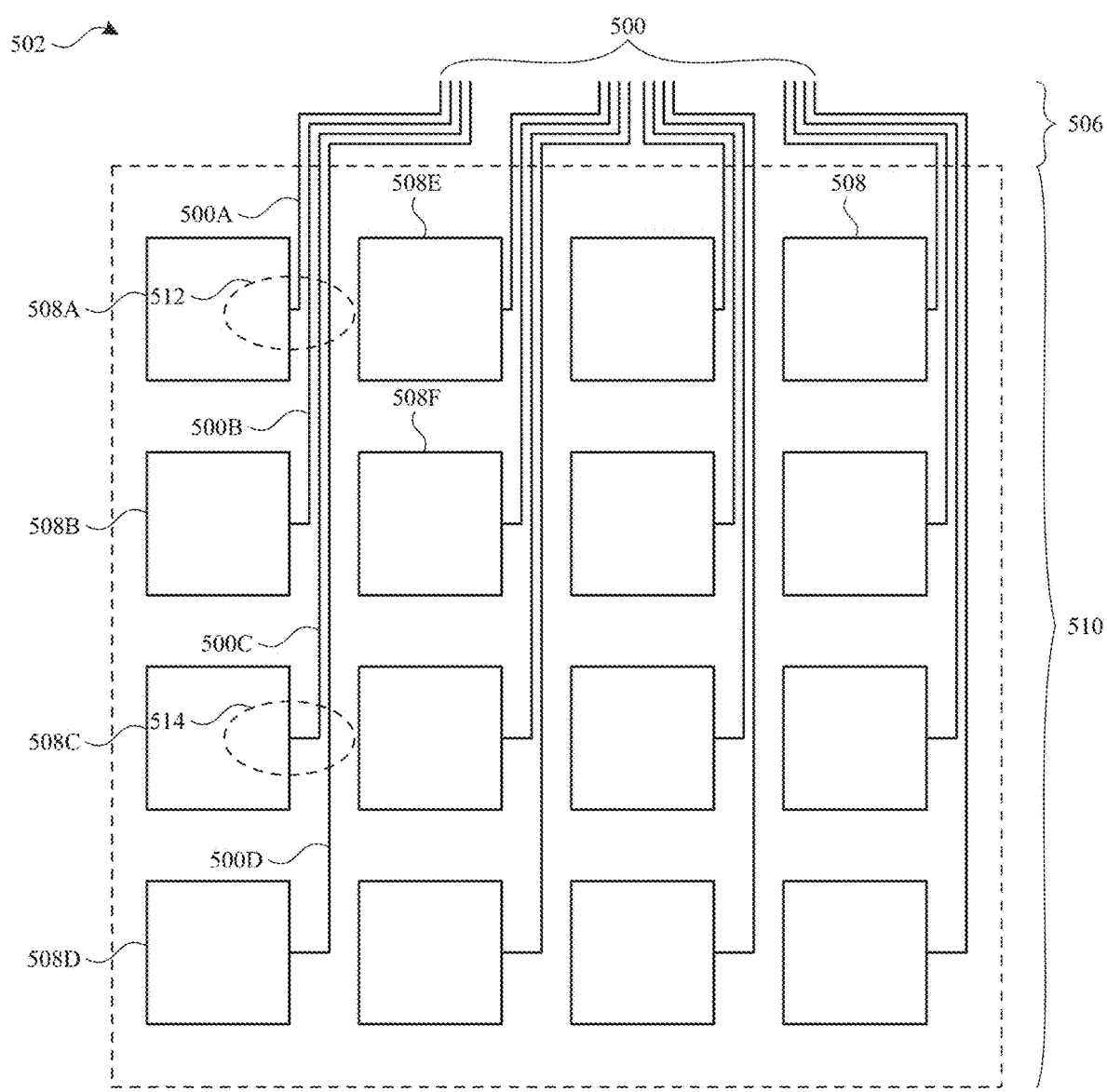
FIG. 5 illustrates a touch sensor panel including touch node electrodes and routing traces according to examples of the disclosure.

In some examples, routing traces for touch node electrodes of a touch sensor panel (e.g., in a pixelated touch node electrode configuration) can be disposed in between touch node electrodes. FIG. 5 illustrates a touch sensor panel including touch node electrodes and routing traces according to examples of the disclosure. Touch sensor panel 502 can include an array of touch node electrodes 508 (e.g., corresponding to touch node electrodes 408) arranged in rows and columns (e.g., a four-by-four array) in an active region 510 that can be used for sensing a touch image as described above with respect to FIGS. 2 and 4A-4B. The active region can refer to a region of a touch sensor panel (or touch screen) including touch node electrodes configured to sense objects touching or in proximity to the touch node electrodes (and, in some examples, to a region of a touch screen including display components visible to a user of a device including the touch screen). The touch node electrodes 508 can be connected to sensing circuitry (e.g., sensing circuitry illustrated in FIGS. 3A and/or 3B) disposed outside the active region 510 and/or behind the touch sensor panel (or touch screen) by routing traces 500. In some examples, routing traces 500 can extend from a border region 506 outside of active region 510 to touch node electrodes 508 in active region 510. In some examples, an active region 510 can correspond to an active display area of an electronic device where display pixels can be used to display an image, whereas the border area 506 can be free of display pixels. In some such examples, the touch sensor electrodes 508 and/or routing traces 500 in active region 510 can be formed from transparent or at least translucent conductive material (e.g., ITO). In some examples, touch sensor electrodes 508 and/or routing traces 500 in active region 510 can be formed from non-transparent conducive material that is sufficiently thin and sparse to appear transparent to the human eye (e.g., silver nanowires, carbon nanotubes, etc.). The routing traces 500 can be used to route signals from the touch sensor electrodes 508 toward border region 506 of an electronic device (e.g., to one edge or multiple edges of the touch sensor panel 502). In some examples, the routing trace 500 in the border region may be formed from or otherwise include a non-transparent conductor (e.g., because border region 506 may not be over the display pixels or otherwise visible to a user). In some examples, the non-transparent conductor material of the routing traces 500 in border region 506 can have a lower resistance per square area than the routing traces 500 in active region 510 (e.g., using copper routing traces in the border region and ITO routing traces in the active region, using thin, sparse conductive material in the active region and thicker, denser conductive material in the border region, etc.). Accordingly, the border region 506 can be utilized for routing signals, via the routing traces 500, to sensing circuitry from the touch node electrodes 508 (e.g., using a flexible printed circuit board).

It is understood that FIG. 5 is one example implementation of vertical routing traces for a four by four array of touch node electrodes that terminate at a top edge of a touch sensor panel, but that other implementations are possible. For example, the routing traces may be horizontally and/or vertically routed vertically to different or multiple edges with different fan-outs (e.g., including routing traces routed to the top edge, bottom edge, left edge, right edge, or a combination thereof) without departing from the scope of the present disclosure. It should be understood that a touch sensor panel can include a different numbers of touch node electrodes other than the four by four array of FIG. 5 (greater or fewer) without departing from the scope of the present disclosure. Furthermore, it should be understood that although the example touch sensor panel represents touch node electrodes as having a square shape that different shapes (e.g., rectangular, circular, diamond, etc.) can be used without departing from the scope of the present disclosure, and that the routing traces can follow different layout patterns.

FIG. 5 also illustrates an exemplary object 512 (e.g., a finger) that can capacitively couple to touch node electrodes 508 and/or routing traces 500. For example, object 512 can couple primarily (e.g., with the strongest signal amplitude) to touch node electrode 508A proximate to the location of the finger above the touch sensor panel (proximate or in contact to the touch sensor panel 502). Object 512 can also couple to other proximate touch node electrodes, such as touch node electrodes 508B, 508E and 508F, where the signal amplitude of the coupling can be reduced relative to touch node electrode 508A. As explained above, the readings from each of the touch node electrodes 508 can be used to form an image of touch at the touch sensor panel including object 512. In addition to coupling between object 512 and the touch node electrodes 508, coupling can occur between object 512 and routing traces 500 in the vicinity of the object. As shown in FIG. 5, routing traces 500A-500D, which connect to touch node electrodes 508A-508D, pass directly under object 512. As a result of the capacitive coupling to the routing traces, some signal may be detected by the sensing circuitry coupled to "downstream" touch node electrodes. For example, relative to border region 506, touch node electrodes 508B-508D can be considered downstream relative to the location of object 512. The downstream touch node electrodes can experience some signal contribution (cross-coupling or cross-talk) due to coupling between object 512 and routing traces 500B-500D. In a similar manner an object 514 touching or in proximity to touch sensor panel 502 can result in downstream touch node electrode 508D experiencing some signal contribution due to coupling between object 514 and routing trace 500D, whereas "upstream" touch node electrodes 508A-508B may experience little or no signal contribution from proximity of object 514 to routing traces 500C-500D (e.g., because routing traces 500A-500B are upstream from object 514). The touch node electrode with relatively longer routing traces can experience relatively more capacitive cross-coupling from the routing traces. In some examples, the cross-coupling can be high enough and/or above a touch detection threshold that it interferes with touch accuracy. For example, touch node electrodes near the bottom of touch sensor panel 502 can falsely indicate an object in contact or proximate to the touch sensor panel due to the routing cross-talk. In some examples, the effect of cross-talk can be more pronounced for the corner touch node electrodes (e.g., touch node electrode 508D) and/or edge touch node electrodes (e.g., touch node electrode 508C along the perimeter of the touch sensor panel) due to the relatively longer length of routing traces (e.g., assuming the routing traces are routed to a bond pad in the center of the border region 506 at the top of touch sensor panel 502) as compared with inner touch node electrodes (e.g., touch node electrode 508F).

Figure 6B:
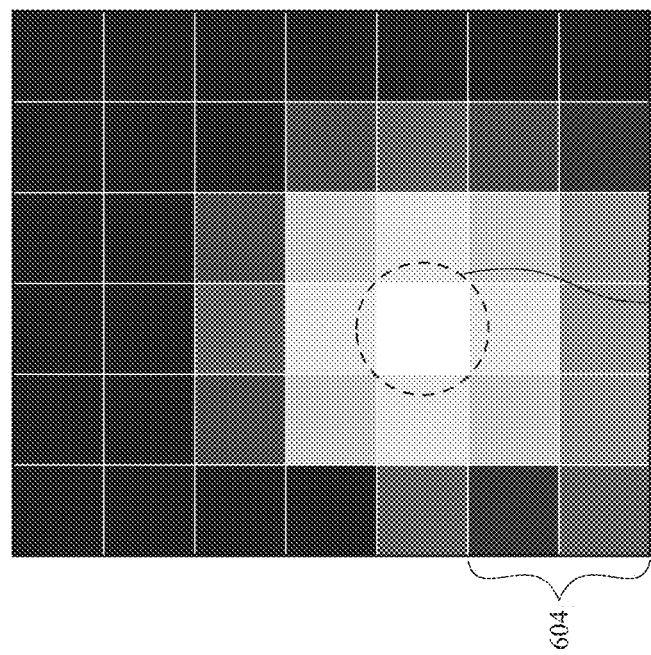
FIGS. 6A-6B illustrate example touch images with and without cross-talk according to examples of the disclosure.
Figure 6A:
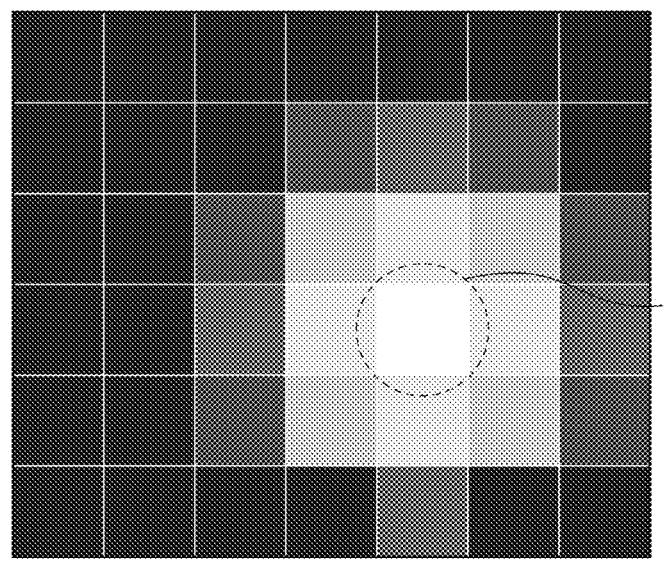

FIGS. 6A-6B illustrate example touch images with and without cross-talk according to examples of the disclosure. FIG. 6A illustrates touch image 600 corresponding to a touch sensor panel with cross-talk due to routing traces in the active region (e.g., corresponding to touch sensor panel 502). FIG. 6B illustrates touch image 610 corresponding to a touch sensor panel without cross-talk (without routing traces in the active region). Touch images 600 and 610 can correspond to measurements of the same touch sensor panel (e.g., the same pattern of touch node electrodes) aside from the existence or non-existence of routing traces in the active region. Touch images 600 and 610 can be two-dimensional images represented in FIGS. 6A-6B as greyscale images representing the intensity of the touch signal at the 7×6 (or more generally, m×n) touch nodes of the touch sensor panel. In the greyscale image, white can represent maximum intensity of a touch signal and black can represent minimum intensity (e.g., zero). Touch images 600 and 610 can include a representation of heightened signal in response to an object 602 (indicated by dashed line) located over a touch node electrode of the touch sensor panel. The maximum touch signal can be co-located at the touch node electrode at which object 602 is located and the nearby touch nodes can also show elevated touch signals, but with reduced intensity compared to the maximum touch signal, according to the touch signal profile for the objects touching or in proximity to the touch sensor panel. It should be that the downstream touch nodes of touch image 600 illustrate a higher intensity of touch signals due to cross-talk compared with those of touch image 610. For example, the bottom two rows 604 of touch nodes in touch image 600 (with routing traces) can have touch nodes with signal elevated by approximately 20%-600% as compared with the touch nodes in touch image 610 (without routing traces). In particular the second to the bottom row can have touch nodes with signal elevated by approximately 20%-50% and the bottom row can have touch nodes with signal elevated by 35%-600%. The cross-talk can result in inaccurate touch detection that can manifest in various ways including degraded accuracy of location of detected touches, increased jitter, and increased false positive detection of objects (e.g., along the bottom edge for the touch sensor panel 502 with routing from the top edge of the touch sensor panel 502). A machine learning model as described herein can be used to mitigate cross-talk.

In some examples, the impact of cross-talk can mitigated by increasing a touch detection threshold. However, in some examples, increasing the touch detection threshold may result in failure to identify a true touch, particularly for touch sensor panels with reduced touch signal (e.g., for a touch sensor panel with a reduced signal-to-noise ratio (SNR) as compared with other touch sensor panels). For example, touch sensor panels may have different properties (different stimulation voltages, different touch electrode patterns, different stackup arrangements or thicknesses, different capacitive sensing type, etc.) that may cause the reduced SNR.

In some examples, as described herein, a machine learning model (e.g., a deep learning model) can be used to reduce or eliminate cross-talk. In some examples, the machine learning model may improve the accuracy of touch detection for a lower SNR touch sensor panel, whether due to reduced signal level for the touch sensor panel and/or due to increase in noise. For example, the reduced SNR may be due to external or internal noise aggressors (e.g., during device charging), an ungrounded user (e.g., increase in impedance between the user's finger and ground due to isolation between the user and device ground), screen protectors, etc.

Figure 7:
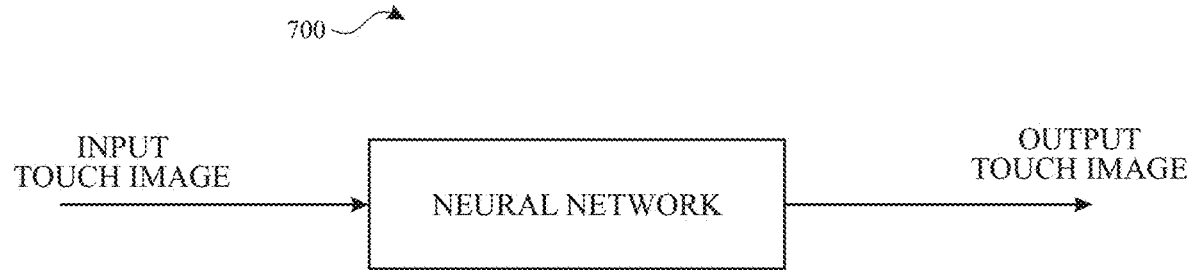
FIG. 7 illustrates an example neural network according to examples of the disclosure.

As described herein, the machine learning model can be a deep learning model. In some examples, the learning model can be implemented using a neural network (e.g., machine learning processing circuit) including one or more convolutional layers. Additionally, in some examples, the neural network can optionally include one or more fully connected layers. FIG. 7 illustrates an example neural network according to examples of the disclosure. For example, FIG. 7 illustrates a convolutional neural network (CNN) 700. CNN 700 can accept an input touch image including cross-talk and can output a touch image with mitigated cross-talk. In some examples, CNN 700 can accept a plurality of touch images (e.g., two or more touch images). The machine learning model can receive the plurality of touch images and can mitigate the cross-talk for one or more of the plurality of touch images. Although FIG. 7 illustrates a CNN, it is understood that other machine learning models may be used (e.g., a recurrent neural network (RNN)).

Neural network 700 can include one or more convolutional layers and one or more fully connected layers. In some examples, the neural network can include one or more convolutional layers without fully connected layers. In some examples, each of the convolutional layers can convolve the input to the convolutional layer with multiple filters. The multiple filters can include filter coefficients that may be set via training. Optionally, each of the convolutional layers can also include a non-linear function layer and/or down-sampling/pooling layer to implement non-linarites and/or simplify a feature set (e.g., change the resolution of the output) before processing by a subsequent layer. In some examples, the neural network can include 2-10 convolutional layers. In some examples, the neural network can include 3-5 convolutional layers. In some examples, the output of the one or more convolutional layers can be input to a classification layer. The classification layer can include one or more flattening layers and one or more fully connected layers to generate the output touch image with mitigated cross-talk. It is understood that neural network 700 is one example, but the neural network for mitigating cross-talk described herein can be achieved using fewer, more and/or different layers in the same or different configurations.

In some examples, the machine learning models can be stored in memory (e.g., RAM 212) and processing circuitry (e.g., touch processor 202) and/or host processor 228 can be configured to implement the neural network (e.g., CNN 700), or other suitable machine learning model or neural network) stored in memory.

In some examples, the machine learning model can generate the output touch image with mitigated cross-talk based on training the machine learning model. For example, the training data can include training touch images generated using two touch sensor panels. A first touch sensor panel can include routing traces in the active region (e.g., corresponding to touch sensor panel 502) and a second touch sensor panel can exclude routing traces in the active region or exclude routing traces entirely. The training touch images generated using the two touch sensor panels can be annotated to include the known locations of touch inputs (e.g., the size and/or location of the object(s) on the touch sensor panels). In some examples, the training touch images can be generated empirically by applying one or more touch objects to implemented touch sensor panels. In some examples, the training touch images can be generated using simulation (e.g., finite element analysis) of the two touch sensor panels.

In some examples, the training touch images can include touch images including a single object touching the touch sensor panel. For example, FIGS. 6A-6B can be representative of one set of training touch images corresponding to a touch of object 602. Touch image 600 can correspond to a touch image of the first touch sensor panel including routing traces in the active region and touch image 610 can correspond to a touch image of the second touch sensor panel without routing traces in the active region. Additionally or alternatively, in some examples, the training touch images can include touch images including one or more objects touching the touch sensor panel. Using training touch images including multiple touching objects can provide the machine learning model with information about object touch profiles (e.g., the distribution of signal across touch nodes due to an object) in the presence of one object or more than one object that can improve the ability of the machine learning model to remove cross-talk in both single and multi-touch contexts.

Figure 8:
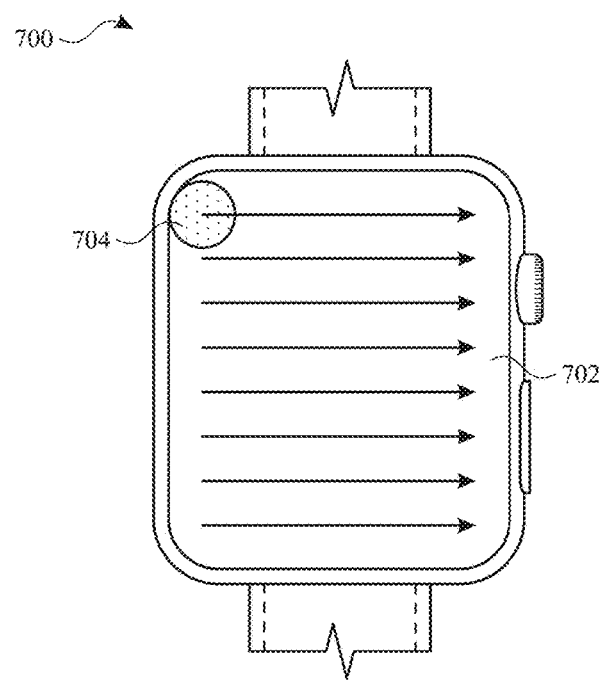
FIG. 8 illustrates an example touch screen of an electronic device and an object in contact with the touch screen in accordance with examples of the disclosure.

As described herein, using a machine learning model to mitigate cross-talk can improve touch detection. In some examples, mitigating cross-talk can improve accuracy of touch detection (e.g., accuracy of an estimation of the location of the object) and/or reduce jitter (variation in the estimated location) of a single object in contact with or proximity to the touch sensor panel. FIG. 8 illustrates a touch screen of an electronic device and an object in contact with the touch screen in accordance with examples of the disclosure. For example, electronic device 800 can be a wearable device including touch screen 802 (corresponding to wearable device 150 and touch screen 132). Object 804 in contact with touch screen 802 can be moved to different locations of the touch screen 802. For example, the object can be moved using a raster scan pattern (moving from left to right, row by row). The measured centroid of the object can be compared with the known location of the object on the touch screen to determine accuracy of the touch detection.

In some examples, using the machine learning model discussed herein, the accuracy of the touch detection can be within 1.8 mm (e.g., the distance between the measured location and the known location can be less than 1.8 mm) at a minimum operating SNR for the touch screen (e.g., at a specification noise limit for the device) for the x-axis location and the y-axis location (whereas the accuracy for touch detection without the machine learning model may be within 2-2.5 mm). In some examples, using the machine learning model discussed herein, the accuracy of the touch detection can be within 1.7 mm at a minimum operating SNR for the touch screen. In some examples, using the machine learning model discussed herein, the accuracy of the touch detection can be within 1.6 mm at a minimum operating SNR for the touch screen. In some examples, using the machine learning model discussed herein, the accuracy of the touch detection can be within 1.5 mm at a minimum operating SNR for the touch screen. In some examples, using the machine learning model discussed herein, the accuracy of the touch detection can be within 1.4 mm at a minimum operating SNR for the touch screen. In some examples, using the machine learning model discussed herein, the accuracy of the touch detection can be within 1.3 mm at a minimum operating SNR for the touch screen. In some examples, using the machine learning model discussed herein, the accuracy of the touch detection can be within 1 mm at a minimum operating SNR for the touch screen. It should be understood that in some examples the accuracy of the touch detection can be within even smaller distances (e.g., 0.2-0.9 mm). In some examples, the SNR can be below a threshold (e.g., below 3, 3.5, 4, 4.5, 5 or some other SNR threshold). In some examples, the accuracy can be even better under higher SNR conditions (e.g., lower noise or higher touch signal). In some examples, the accuracy can be different for different regions of the touch screen. For example, the minimum accuracy can be within 1.5 mm for touch node electrodes in the corner of the device (e.g., such as touch node electrode 508D), within 1 mm for touch node electrodes along the edge of the device (e.g., such as touch node electrode 508C), and within 0.8 mm for touch node electrodes in the interior of the device (e.g., such as touch node electrode 508F) at the minimum operating SNR for the touch screen (whereas the accuracy for touch detection without the machine learning model may be greater for inner touch node electrodes and for edge and corner touch node electrodes by 50%-100% or more). In some examples, the minimum accuracy can be even lower than 1.5 mm (e.g., 1.4, 1.3 mm, 1.2 mm, 1.1 mm, 1 mm, 0.9 mm, etc.) for touch node electrodes in the corner of the device, can be even lower than 1 mm (e.g., 0.9 mm, 0.8 mm, 0.7 mm, 0.6 mm, etc.) for touch node electrodes along the edge of the device, and can be even lower than 0.8 mm (e.g., 0.7 mm, 0.6 mm, 0.5 mm, 0.4 mm, 0.3 mm, etc.) for touch node electrodes in the interior of the device at the minimum operating SNR for the touch screen.

In some examples, using the machine learning model discussed herein, the maximum jitter of the touch detection can be less than 1 mm (e.g., the variation of the distance between the measured location and the known location can be less than 1 mm) at a minimum operating SNR for the touch screen (e.g., at a specification noise limit for the device) for the x-axis location and the y-axis location. In some examples, the jitter can be even lower (e.g., less than 0.8 mm, 0.7 mm, 0.6 mm, 0.5 mm, 0.4 mm, 0.3 mm, etc.). This jitter can be a reduction compared to other cross-talk mitigation techniques (e.g., 50-75% reduction in jitter), such as linear regression techniques. In some examples, the jitter can be even better under higher SNR conditions (e.g., lower noise or higher touch signal). In some examples, the jitter can be different for different regions of the touch screen. For example, the maximum jitter can be within 1 mm or lower (e.g., within 0.5 mm, 0.4 mm, 0.35 mm, 0.3 mm, etc.) for touch node electrodes in the corner of the device (e.g., such as touch node electrode 508D), within 0.8 mm or lower (e.g., within 0.4 mm, 0.3 mm, 0.25 mm, etc.) for touch node electrodes along the edge of the device (e.g., such as touch node electrode 508C), and within 0.6 mm or lower (within 0.35 mm, 0.3 mm, 0.25 mm, etc.) for touch node electrodes in the interior of the device (e.g., such as touch node electrode 508F) at the minimum operating SNR for the touch screen.

Figure 9A:
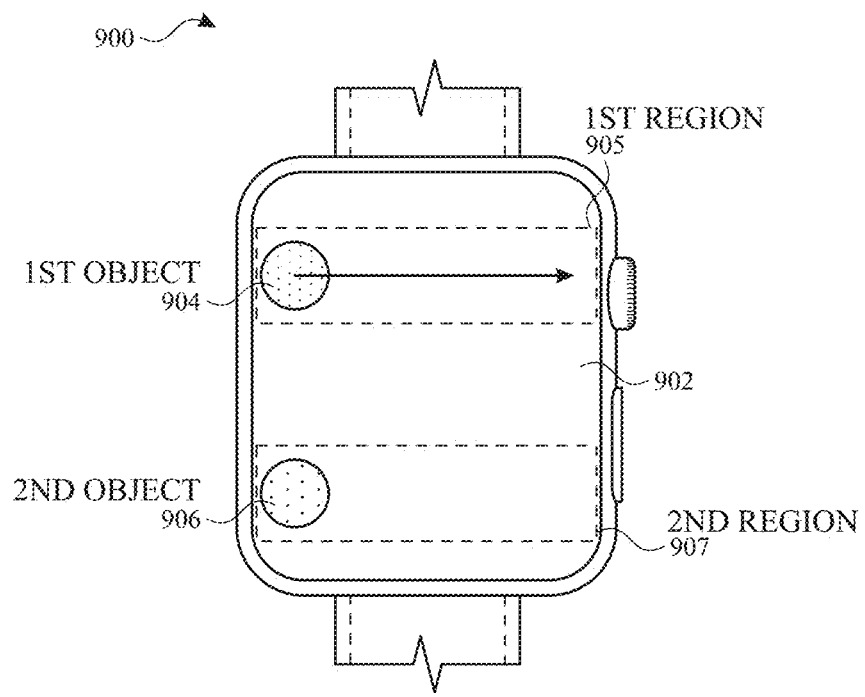
FIG. 9A illustrates an example touch screen of an electronic device and multiple objects in contact with the touch screen according to examples of the disclosure.

In some examples, mitigating cross-talk can reduce jitter (variation in the estimated location) for multiple objects in contact with or proximity to the touch sensor panel. FIG. 9A illustrates a touch screen of an electronic device and multiple objects in contact with the touch screen according to examples of the disclosure. For example, electronic device 900 can be a wearable device including touch screen 902 (corresponding to wearable device 150 and touch screen 132). First object 904 in contact with touch screen 902 can be moved across a first region 905 of touch screen 902 while a second object 906 in contact with a second region 907 of touch screen 902 can remain stationary (e.g., at a lower left-hand corner). The first region of the touch screen can experience relatively low levels of cross-talk relative to the second region of the touch screen/touch sensor panel. For example, the first region of the touch screen can be within a first threshold distance of a first edge of the touch screen (e.g., proximate to the routing termination at the top edge in FIG. 5) and the second region of the touch screen can be within a second threshold distance of a second edge of the touch screen (e.g., close to the bottom edge in FIG. 5). The measured centroid of the second object can be compared with the known location of the object on the touch screen to determine jitter of the second object during movement of the first object.

Figure 9B:
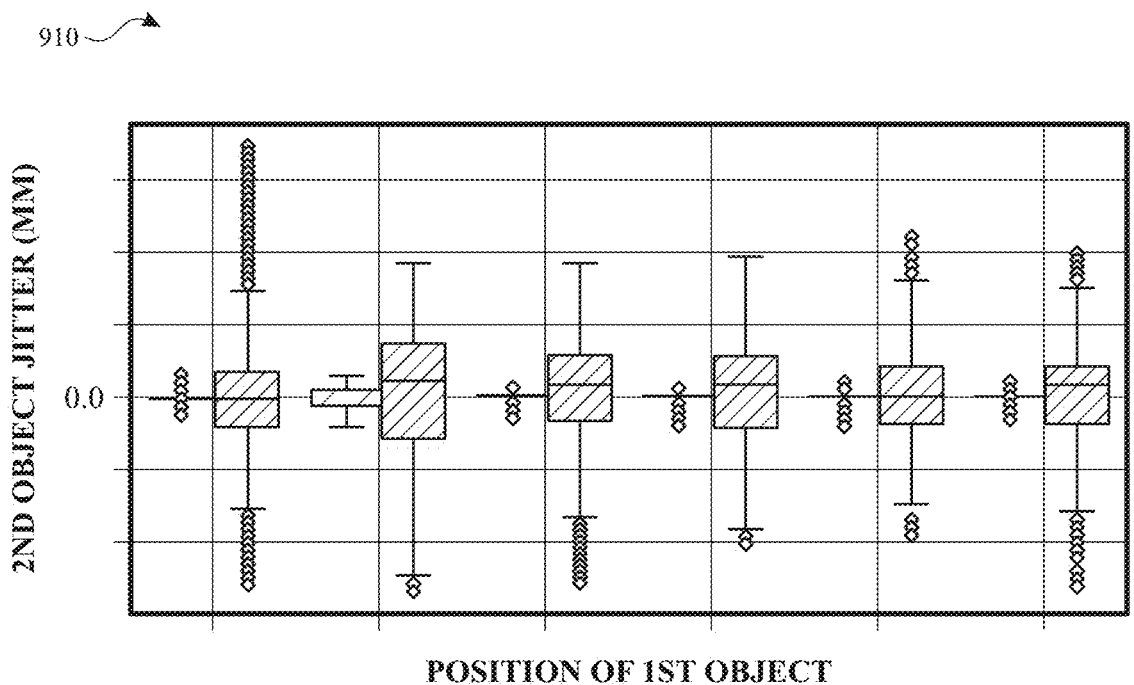
FIG. 9B illustrates an example plot of jitter for a second object as a first object moves across a touch screen according to examples of the disclosure.

FIG. 9B illustrates an example plot 910 of jitter for a second object as a first object moves across a touch screen according to examples of the disclosure. The jitter can be quantified based on statistical parameters of variation (e.g., with respect to zero variation) of the centroid for the second object (e.g., along the x-axis of device 900). For example, the quantification can be on the minimum, maximum, max-min range, median, first quartile, third quartile, interquartile range or based on a range of outliers. Plot 910 illustrates measurements of jitter of the second object at six positions for the first object. At each position of the first object (along the x-axis of plot 910), a first box plot is shown (on the left) for the machine learning model to mitigate cross-talk and a second box plot is shown (on the right) for another technique for mitigation of cross-talk (e.g., a linear regression). As shown in plot 910, jitter using the machine learning model is lower than using another technique. For example, using the range of outliers as a measure of jitter using the machine learning model appears to be approximately the same or smaller than the interquartile range as a measure of jitter using another technique. Additionally, the interquartile range of jitter using the machine learning model is less than or equal to 0.1 mm. In some examples, using the machine learning model discussed herein, the jitter of the second object can be less than 0.05 mm (e.g., the variation of the distance between the measured location and the known location can be less than 0.05 mm) at a minimum operating SNR for the touch screen (e.g., at a specification noise limit for the device) and/or while charging the device (e.g., with noise from an inductive or other charger). In some examples, the SNR can be below a threshold (e.g., below 3, 3.5, 4, 4.5, 5 or some other SNR threshold). In some examples, the jitter can be less than 0.04 mm. In some examples, the jitter can be less than 0.035 mm. In some examples, the jitter can be less than 0.02 mm (or even lower). This jitter can be a reduction compared to other cross-talk mitigation techniques (e.g., up to 8 times lower jitter). In some examples, the jitter can be even better under higher SNR conditions (e.g., lower noise or higher touch signal).

Figure 10A:
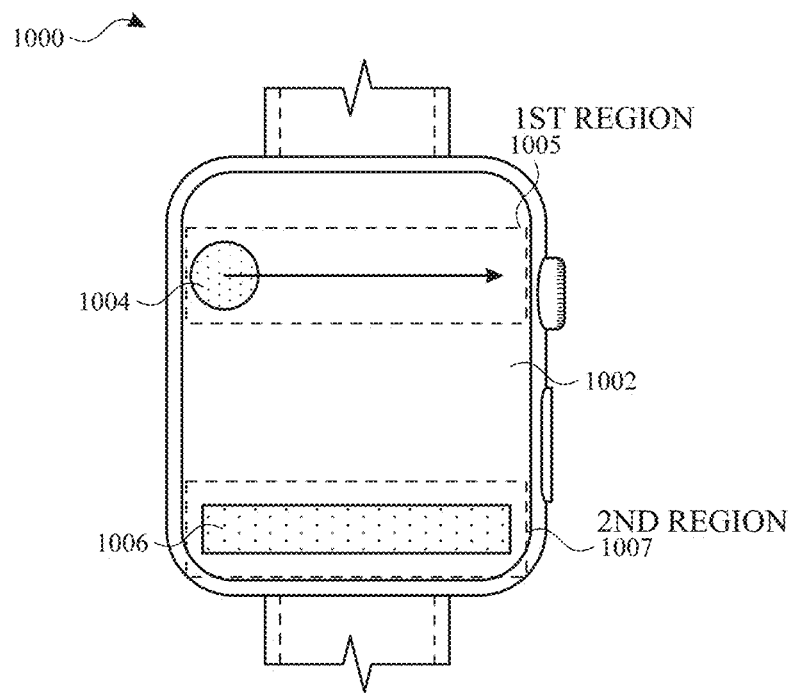
FIG. 10A illustrates an example touch screen of an electronic device and an object in contact with the touch screen in accordance with examples of the disclosure.

In some examples, mitigating cross-talk can reduce false positive detection of contacts in a region of the touch sensor panel that experiences relatively large levels of cross-talk. For example, a movement of an object in contact with or proximity to a touch sensor panel in a first region of the touch sensor panel can cause false positive detection of contacts in a second region of the touch sensor panel due to cross-talk. FIG. 10A illustrates a touch screen of an electronic device and an object in contact with the touch screen in accordance with examples of the disclosure. For example, electronic device 1000 can be a wearable device including touch screen 1002 (corresponding to wearable device 150 and touch screen 132). Object 1004 in contact with touch screen 1002 can be moved across a first region 1005 of touch screen 1002 without the presence of another object in the second region 1007. In some examples, due to cross-talk described herein, a second object 1006 may be incorrectly detected in second region 1007. In some examples, the detection of second object 1006 can cause unintended input to the touch screen. For example, the incorrect detection of second object 1006 and/or movement thereof (e.g., swipe up) may partially or fully launch a user interface (e.g., control center or notification center) on touch screen 1002. In some examples, the movement of the incorrectly detected second object can be orthogonal to (or within a threshold angle of orthogonal, such as ±45°, ±60°, etc.) the direction of movement of the first object. The unintended input can degrade the user experience. In some examples, cross-talk mitigation using machine learning can reduce the number of false positive detections of objects and/or false positive triggering of a response to such an input.

Figure 10B:
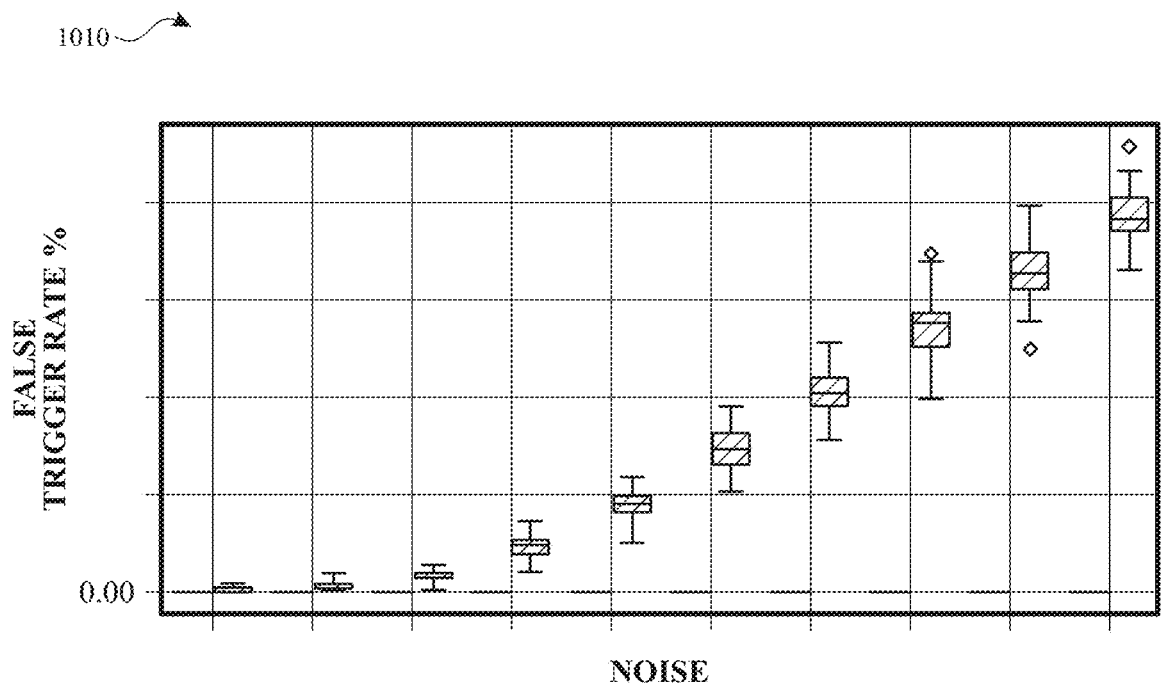
FIG. 10B illustrates an example plot of a false trigger rate in a second region of a touch screen as a first object moves across a touch screen in a first region of the touch screen according to examples of the disclosure.

FIG. 10B illustrates an example plot 1010 of a false trigger rate in a second region of a touch screen as a first object moves across a touch screen in a first region of the touch screen according to examples of the disclosure. Plot 1010 illustrates measurements of false trigger rate at different noise levels (with noise increasing from left to right). In some examples, the SNR for at least some of the noise levels can be below a threshold (e.g., below 3, 3.5, 4, 4.5, 5 or some other SNR threshold). At each noise level, a first box plot is shown (on the left) for the machine learning model to mitigate cross-talk and a second box plot is shown (on the right) for another technique for mitigation of cross-talk (e.g., a linear regression). As shown in plot 1010, the error rate can be less than 0.1% across the plotted noise levels using the machine learning model and is equivalent to or better in performance (lower false trigger rate) at any noise level as compared with using another technique. Stated another way, the device can forgo detecting an input in a second region (and/or forgo activating a user interface) with greater than a threshold accuracy of 99.9%. In some examples, the error rate can be less than 1% and the threshold accuracy can be 99%. In some examples, the error rate can be less than 0.5% and the threshold accuracy can be 99.5%.

Figure 11:
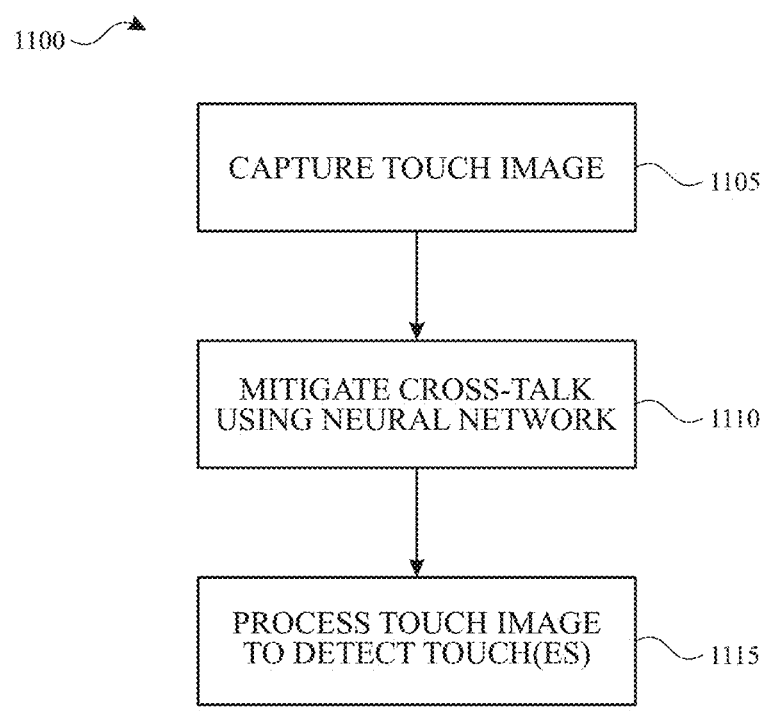
FIG. 11 illustrates an example process for mitigation of cross-talk according to examples of the disclosure.

FIG. 11 illustrates an example process 1100 for mitigation of cross-talk according to examples of the disclosure. At 1105, a touch image can be captured via a touch sensing scan (e.g., a self-capacitance touch sensing scan of the touch nodes of a touch screen/panel). At 1110, the machine learning model (e.g., CNN 700 or other neural network or machine learning model) can mitigate cross-talk from and output a touch image with reduced cross-talk. At 1115, the touch image can be processed to detect one or more touches (e.g., segmenting the touch image, determining a centroid for one or more touches, etc.).

Therefore, according to the above, some examples of the disclosure are directed to a touch-sensitive device. The touch-sensitive device can comprise a plurality of touch electrodes; sensing circuitry configured to measure signals at the plurality of touch electrodes to generate a touch image, and machine learning processing circuitry. The signal-to-noise ratio (SNR) for measurement of the signals can be less than a threshold SNR. The machine learning processing circuitry can be configured to: in response to an object contacting a first region of the touch-sensitive device and moving across the touch-sensitive device in a first direction, forgo detecting an input in a second region different than the first region with greater than a threshold accuracy. Additionally or alternatively to one or more of the examples disclosed above, in some examples, the first region can be within a threshold distance from a first edge of the touch-sensitive device and the second region can be within a threshold distance from a second edge of the touch-sensitive device opposite the first edge of the touch-sensitive device. Additionally or alternatively to one or more of the examples disclosed above, in some examples, the plurality of touch electrodes can include first touch electrodes in the first region and second touch electrodes in the second region. The second touch electrodes can be routed to the sensing circuitry using routing traces within a threshold distance of first touch electrodes such that the object contacting the first region results in cross-coupling to the second touch electrodes in the second region. Additionally or alternatively to one or more of the examples disclosed above, in some examples, the input in the second region can include movement of a threshold distance across the touch-sensitive device in a second direction different than the first direction with greater than a threshold distance. Additionally or alternatively to one or more of the examples disclosed above, in some examples, the input can trigger activation of a user interface following the movement of the threshold distance. Additionally or alternatively to one or more of the examples disclosed above, in some examples, the second direction can be within a threshold angle of orthogonal to the first direction. Additionally or alternatively to one or more of the examples disclosed above, in some examples, the threshold SNR can be less than 5. Additionally or alternatively to one or more of the examples disclosed above, in some examples, the threshold accuracy can be 99.9% (e.g., 0.1% false positive trigger rate). Additionally or alternatively to one or more of the examples disclosed above, in some examples, the threshold accuracy can be 99% (e.g., 1% false positive trigger rate).

Some examples of the disclosure are directed to a method. The method can comprise measuring signals at a plurality of touch electrodes of a touch-sensitive device to generate a touch image (e.g., with an SNR for measurement of the signals less than a threshold SNR); and in response to an object contacting a first region of the touch-sensitive device and moving across the touch-sensitive device in a first direction, forgoing detecting an input in a second region different than the first region with greater than a threshold accuracy (e.g., using a machine learning model/machine learning model circuitry). Additionally or alternatively to one or more of the examples disclosed above, in some examples, the first region can be within a threshold distance from a first edge of the touch-sensitive device and the second region can be within a threshold distance from a second edge of the touch-sensitive device opposite the first edge of the touch-sensitive device. Additionally or alternatively to one or more of the examples disclosed above, in some examples, the plurality of touch electrodes can include first touch electrodes in the first region and second touch electrodes in the second region. The second touch electrodes can be routed to the sensing circuitry using routing traces within a threshold distance of first touch electrodes such that the object contacting the first region results in cross-coupling to the second touch electrodes in the second region. Additionally or alternatively to one or more of the examples disclosed above, in some examples, the input in the second region can include movement of a threshold distance across the touch-sensitive device in a second direction different than the first direction with greater than a threshold distance. Additionally or alternatively to one or more of the examples disclosed above, in some examples, the input can trigger activation of a user interface following the movement of the threshold distance. Additionally or alternatively to one or more of the examples disclosed above, in some examples, the second direction can be within a threshold angle of orthogonal to the first direction. Additionally or alternatively to one or more of the examples disclosed above, in some examples, the threshold SNR can be less than 5. Additionally or alternatively to one or more of the examples disclosed above, in some examples, the threshold accuracy can be 99.9% (e.g., 0.1% false positive trigger rate). Additionally or alternatively to one or more of the examples disclosed above, in some examples, the threshold accuracy can be 99% (e.g., 1% false positive trigger rate). Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Some examples of the disclosure are directed to a touch-sensitive device. The touch-sensitive device can comprise: a plurality of touch electrodes; sensing circuitry configured to measure signals at the plurality of touch electrodes to generate a touch image; and machine learning processing circuitry. An SNR for measurement of the signals can be less than a threshold SNR. The machine learning processing circuitry can be configured to: in response to a first object contacting a first region of the touch-sensitive device and moving across the touch-sensitive device in a first direction and a second object contacting a second region of the touch-sensitive device different than the first region, detect a position of the second object with a jitter less than a threshold jitter as the first object moves across the touch-sensitive device. Additionally or alternatively to one or more of the examples disclosed above, in some examples, the first region can be within a threshold distance from a first edge of the touch-sensitive device and the second region can be within a threshold distance from a second edge of the touch-sensitive device opposite the first edge of the touch-sensitive device. Additionally or alternatively to one or more of the examples disclosed above, in some examples, the plurality of touch electrodes can include first touch electrodes in the first region and second touch electrodes in the second region. The second touch electrodes can be routed to the sensing circuitry using routing traces within a threshold distance of first touch electrodes such that the object contacting the first region results in cross-coupling to the second touch electrodes in the second region. Additionally or alternatively to one or more of the examples disclosed above, in some examples, the threshold SNR can be less than 5. Additionally or alternatively to one or more of the examples disclosed above, in some examples, the threshold jitter can be less than 0.1 mm. Additionally or alternatively to one or more of the examples disclosed above, in some examples, the threshold jitter can be less than 0.05 mm. Additionally or alternatively to one or more of the examples disclosed above, in some examples, the threshold jitter can be less than 0.02 mm. Some examples of the disclosure are directed to a method of operating the above touch-sensitive device. Some examples of the disclosure are directed to a non-transitory computer readable storage medium. The non-transitory computer readable storage medium can store instructions, which when executed by an electronic device comprising processing circuitry, can cause the processing circuitry to operate the above touch-sensitive device.

Some examples of the disclosure are directed to a touch-sensitive device. The touch-sensitive device can comprise: a plurality of touch electrodes including first touch electrodes in a first region and second touch electrodes in a second region; sensing circuitry configured to measure signals at the plurality of touch electrodes to generate a touch image; a plurality of routing traces configured to route the plurality of touch electrodes to the sensing circuitry, the plurality of routing traces including first routing traces to route the first touch electrodes to the sensing circuitry and second routing traces to route the second touch electrodes to the sensing circuitry, the second routing traces within a threshold distance of the first touch electrodes such that an object contacting the first region results in cross-coupling to the second touch electrodes in the second region; and machine learning processing circuitry configured to process the touch image to reduce the cross-coupling and detect a position of an object in contact with the touch-sensitive device. Additionally or alternatively to one or more of the examples disclosed above, in some examples, the machine learning processing circuitry can be configured to detect the position of an object within a threshold distance while an SNR for measurement of the signals is less than a threshold SNR. Additionally or alternatively to one or more of the examples disclosed above, in some examples, the threshold distance can be less than 1.5 mm. Additionally or alternatively to one or more of the examples disclosed above, in some examples, the threshold distance can be less than 1.0 mm. Additionally or alternatively to one or more of the examples disclosed above, in some examples, the threshold distance can be less than 0.5 mm. Additionally or alternatively to one or more of the examples disclosed above, in some examples, the machine learning processing circuitry can be configured to detect the position of an object with less than a threshold jitter while an SNR for measurement of the signals can be less than a threshold SNR. Additionally or alternatively to one or more of the examples disclosed above, in some examples, the threshold jitter can be less than 1.0 mm. Additionally or alternatively to one or more of the examples disclosed above, in some examples, the threshold jitter can be less than 0.8 mm. Additionally or alternatively to one or more of the examples disclosed above, in some examples, the threshold jitter can be less than 0.5 mm. Additionally or alternatively to one or more of the examples disclosed above, in some examples, the threshold jitter can be less than 0.4 mm. Some examples of the disclosure are directed to a method of operating the above touch-sensitive device. Some examples of the disclosure are directed to a non-transitory computer readable storage medium. The non-transitory computer readable storage medium can store instructions, which when executed by an electronic device comprising processing circuitry, can cause the processing circuitry to operate the above touch-sensitive device.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch-sensitive device comprising:
a plurality of touch electrodes;
sensing circuitry configured to measure signals at the plurality of touch electrodes to generate a touch image, wherein a signal-to-noise ratio (SNR) for measurement of the signals is less than a threshold SNR; and
machine learning processing circuitry configured to:
in response to an object contacting a first region of the touch-sensitive device and moving across the touch-sensitive device in a first direction:
detect a first input from the object in the first region;
detect a second input from the object in a second region, different than the first region, of the touch-sensitive device; and
ignore the second input from the object in the second region with greater than a threshold accuracy.

2. The touch-sensitive device of claim 1, where the first region is within a threshold distance from a first edge of the touch-sensitive device and the second region is within a threshold distance from a second edge of the touch-sensitive device opposite the first edge of the touch-sensitive device.

3. The touch-sensitive device of claim 2, wherein the plurality of touch electrodes includes first touch electrodes in the first region and second touch electrodes in the second region, wherein the second touch electrodes are routed to the sensing circuitry using routing traces within a threshold distance of first touch electrodes such that the object contacting the first region results in cross-coupling to the second touch electrodes in the second region.

4. The touch-sensitive device of claim 1, wherein the second input in the second region includes movement of a threshold distance across the touch-sensitive device in a second direction different than the first direction with greater than a threshold distance.

5. The touch-sensitive device of claim 4, wherein the second input triggers activation of a user interface following the movement of the threshold distance.

6. The touch-sensitive device of claim 4, wherein the second direction is within a threshold angle of orthogonal to the first direction.

7. The touch-sensitive device of claim 1, wherein the threshold SNR is less than 5.

8. The touch-sensitive device of claim 1, wherein the threshold accuracy is 99.9%.

9. The touch-sensitive device of claim 1, wherein the threshold accuracy is 99%.

10. The touch-sensitive device of claim 1, wherein the plurality of touch electrodes is arranged in a pixelated touch electrode configuration.

11. A method comprising:
measuring signals at a plurality of touch electrodes of a touch-sensitive device to generate a touch image, wherein a signal-to-noise ratio (SNR) for measurement of the signals is less than a threshold SNR; and
in response to an object contacting a first region of the touch-sensitive device and moving across the touch-sensitive device in a first direction:
detecting a first input from the object in the first region;
detecting a second input from the object in a second region, different than the first region, of the touch-sensitive device; and
ignoring the second input from the object in the second region with greater than a threshold accuracy.

12. The method of claim 11, where the first region is within a threshold distance from a first edge of the touch-sensitive device and the second region is within a threshold distance from a second edge of the touch-sensitive device opposite the first edge of the touch-sensitive device.

13. The method of claim 12, wherein the plurality of touch electrodes includes first touch electrodes in the first region and second touch electrodes in the second region, wherein the second touch electrodes are routed to the sensing circuitry using routing traces within a threshold distance of first touch electrodes such that the object contacting the first region results in cross-coupling to the second touch electrodes in the second region.

14. The method of claim 13, wherein the second input in the second region includes movement of a threshold distance across the touch-sensitive device in a second direction different than the first direction with greater than a threshold distance.

15. The method of claim 14, wherein the second input triggers activation of a user interface following the movement of the threshold distance.

16. The method of claim 14, wherein the second direction is within a threshold angle of orthogonal to the first direction.

17. The method of claim 11, wherein the threshold SNR is less than 5.

18. The method of claim 11, wherein the threshold accuracy is 99.9%.

19. The method of claim 11, wherein the threshold accuracy is 99%.

20. The method of claim 11, wherein the plurality of touch electrodes is arranged in a pixelated touch electrode configuration.

21. A non-transitory computer readable storage medium storing instructions, which when executed by a touch-sensitive device including a plurality of touch electrodes and processing circuitry, cause the processing circuitry to:

measure signals at a plurality of touch electrodes to generate a touch image, wherein a signal-to-noise ratio (SNR) for measurement of the signals is less than a threshold SNR; and in response to an object contacting a first region of the touch-sensitive device and moving across the touch-sensitive device in a first direction:
  detect a first input from the object in the first region;
  detect a second input from the object in a second region, different than the first region, of the touch-sensitive device; and
  ignore the second input from the object in the second region with greater than a threshold accuracy.

22. The non-transitory computer readable storage medium of claim 21, wherein the threshold accuracy is 99.9%.

23. The non-transitory computer readable storage medium of claim 21, wherein the plurality of touch electrodes is arranged in a pixelated touch electrode configuration.

* * * * *